US010689271B2

(12) United States Patent
Bejan et al.

(10) Patent No.: US 10,689,271 B2
(45) Date of Patent: Jun. 23, 2020

(54) SYSTEM AND METHOD FOR OXIDATION OF AMMONIA

(71) Applicant: XOGEN TECHNOLOGIES INC., Mississauga (CA)

(72) Inventors: Dorin Bejan, Burlington (CA); Craig Gagnon, Milton (CA)

(73) Assignee: XOGEN TECHNOLOGIES INC., Mississauga (CA)

(*) Notice: Subject to any disclaimer, the term of this patent is extended or adjusted under 35 U.S.C. 154(b) by 212 days.

(21) Appl. No.: 15/518,212

(22) PCT Filed: Oct. 9, 2015

(86) PCT No.: PCT/CA2015/051030
§ 371 (c)(1),
(2) Date: Apr. 10, 2017

(87) PCT Pub. No.: WO2016/054749
PCT Pub. Date: Apr. 14, 2016

(65) Prior Publication Data
US 2017/0253502 A1 Sep. 7, 2017

Related U.S. Application Data

(60) Provisional application No. 62/062,369, filed on Oct. 10, 2014.

(51) Int. Cl.
*C02F 1/46* (2006.01)
*C02F 1/467* (2006.01)
*C02F 1/00* (2006.01)
*C02F 101/16* (2006.01)

(52) U.S. Cl.
CPC ............ *C02F 1/4674* (2013.01); *C02F 1/008* (2013.01); *C02F 2101/16* (2013.01);
(Continued)

(58) Field of Classification Search
CPC .... C02F 1/4674; C02F 1/008; C02F 2101/16; C02F 2201/4614; C02F 2201/46145;
(Continued)

(56) References Cited

U.S. PATENT DOCUMENTS 4,701,265 A * 10/1987 Carlsson ............... C02F 1/4674
204/278
2006/0131168 A1 6/2006 Shelp et al.
2006/0163173 A1 7/2006 Suzuki et al.

FOREIGN PATENT DOCUMENTS

CA         2225261 A1    6/1998
CN       101198551 A    6/2008
(Continued)

OTHER PUBLICATIONS

International Patent Application No. PCT/CA2015/051030, International Perliminary Report on Patentability dated Apr. 20, 2017.
(Continued)

*Primary Examiner* — Cameron J Allen
(74) *Attorney, Agent, or Firm* — Borden Ladner Gervais LLP; David Nauman

(57) ABSTRACT

The present disclosure relates generally to oxidation of ammonia using electrochemistry. Methods and systems may include at least one sensor to measure the concentration of ammonia in the effluent and/or the concentration of chlorine gas in the effluent. Methods and systems may also include at least one controller in communication with the sensor and/or the anode to reduce the current density of the anode generating the chlorine, and/or to change the flow rate of the ammonia containing water entering the reactor.

8 Claims, 2 Drawing Sheets

(52) U.S. Cl.
CPC .............. *C02F 2201/4614* (2013.01); *C02F 2201/46135* (2013.01); *C02F 2201/46145* (2013.01); *C02F 2209/001* (2013.01); *C02F 2209/003* (2013.01); *C02F 2209/005* (2013.01); *C02F 2209/14* (2013.01); *C02F 2209/29* (2013.01); *C02F 2209/40* (2013.01)

(58) Field of Classification Search
CPC ............ C02F 2209/001; C02F 2209/14; C02F 2209/29; C02F 2209/40; C02F 2209/003; C02F 2209/005; C02F 1/467; C02F 1/00
See application file for complete search history.

(56) References Cited

FOREIGN PATENT DOCUMENTS

| | | |
|---|---|---|
| CN | 101862646 A | 10/2010 |
| JP | 2004160349 A | 6/2004 |
| JP | 2004202484 A | 7/2004 |
| WO | 2008062970 A1 | 5/2008 |
| WO | 2013176032 A1 | 11/2013 |

OTHER PUBLICATIONS

International Patent Application No. PCT/CA2015/051030, International Search Report and Written Opinion dated Dec. 22, 2015.
European Patent Application No. 15848194.5, Extended European Search Report dated Feb. 28, 2018.
Chinese Patent Application No. CN20158066969, Office Action and English Translation dated Mar. 20, 2020.

\* cited by examiner

SYSTEM AND METHOD FOR OXIDATION OF AMMONIA

CROSS REFERENCE TO RELATED APPLICATIONS

This application claims the benefit of U.S. Provisional Application Ser. No. 62/062,369, filed Oct. 10, 2014. This application is incorporated by reference.

FIELD

The present disclosure relates generally to oxidation of ammonia using electrochemistry.

BACKGROUND

Oxidation of ammonia using chlorine may be used to remove low levels of ammonia from water, for example wastewater. Chlorine gas rapidly disproportionates in water to form hypochlorous acid (HOCl), hydronium ion ($H_3O^+$), and chloride ion ($Cl^-$) according to the following reaction:

$$2H_2O_{(l)} + Cl_{2(gas)} \leftrightarrow HOCl + H_3O^+ + Cl^-$$

The hypochlorous acid is a weak acid with a pKa of 7.6 at 25° C. and can transfer a proton with formation of hypochlorite ion (OCl—).

The hypochlorous acid reacts with ammonia according to the following reactions:

$$2NH_3 + 3HOCl \rightarrow N_{2(gas)} + 3H^+ + 3Cl^- + 3H_2O$$

which means that one mole of ammonia reacts with 1.5 moles of chlorine or, in terms of weight 1 mg of ammonia as N needs to react with 7.6 mg of chlorine as $Cl_2$ in order to produce nitrogen gas. If a smaller ratio is used inorganic chloramines are produced according to the following reactions:

$$NH_3 + HOCl \rightarrow NH_2Cl + H_2O$$

$$NH_2Cl + HOCl \rightarrow NHCl_2 + H_2O$$

$$NHCl_2 + HOCl \rightarrow NCl_3 + H_2O$$

The mixture of monochloramine, dichloramine and trichloramine has different proportion depending on pH, temperature, and ratio of chlorine to ammonia ($Cl_2$:N).

The main additional oxidized product may be nitrate ($NO_3^-$) formed by following reaction:

$$NH_4^+ + 4HOCl \rightarrow NO_3^- + 4Cl^- + 6H^+ + H_2O$$

It is desirable reduce the amount of hypochlorous acid and/or hypochlorite, generated by the reaction between chlorine gas and water, remaining in the waste water after the ammonia has been oxidized.

SUMMARY

It is an object of the present disclosure to obviate or mitigate at least one disadvantage of previous methods and systems for oxidizing ammonia using chlorine.

In one aspect, there is provided a system for continuous treatment of a wastewater that includes ammonia. The system includes an inlet that accepts the wastewater to the system at a flow rate that can be varied by a flow rate controller; an electrochemical cell that generates chlorine from chloride ions present in the wastewater; a reaction zone that is sized and shaped to permit the generated chlorine to form hypochlorous acid, and to permit the hypochlorous acid to oxidize the ammonia; and an outlet that discharges the treated wastewater from the system as an effluent. The system also includes a sensor that measures the concentration of ammonia in the effluent; a sensor that measures the concentration of chlorine in the effluent; and at least one controller in communication with: the ammonia sensor, the chlorine sensor, or both; and an anode of the electrochemical cell, the flow rate controller, or both. The at least one controller controls at least one of: the current density of the anode of the electrochemical cell; and the flow rate of the wastewater accepted by the inlet.

The system may also include: a second ammonia sensor that measures the concentration of ammonia in the wastewater being accepted into the system; and at least one controller in communication with the second ammonia sensor and with the anode of the electrochemical cell. The at least one controller controls the current density of the anode of the electrochemical cell.

The chloride ions may be present in the wastewater prior to the wastewater being accepted by the inlet. Alternatively, the system may include a source of chloride ions for adding to the wastewater prior to the wastewater being treated in the electrochemical cell.

The at least one controller and the ammonia sensor may be configured to: increase the current density applied to the anode by an amount when the ammonia concentration in the effluent exceeds 0.5 ppm and the current density is less than 12 mA/cm²; reduce the flow rate of the wastewater accepted by the inlet when the ammonia concentration in the effluent exceeds 0.5 ppm and the current density is 12 mA/cm² or greater; or both. The increase in current density may be about 0.5 mA/cm². The reduction in the flow rate may be about 1.5%.

The at least one controller, the ammonia sensor and the chlorine sensor may also be configured to: decrease the current density applied to the anode by an amount when the ammonia concentration in the effluent is less than 0.5 ppm and the concentration of chlorine is from 0.8-2 ppm; increase the flow rate of the wastewater accepted by the inlet when the flow rate is less than an initial flow rate and when the ammonia concentration in the effluent is less than 0.5 ppm and the concentration of chlorine is from 0.8-2 ppm; decrease the current density applied to the anode by an amount greater than the decrease in current density when the ammonia concentration in the effluent is less than 0.5 ppm and the concentration of chlorine is from 0.8-2 ppm, the greater decrease being when the ammonia concentration in the effluent is less than 0.5 ppm and the concentration of chlorine is from 2-10 ppm; or any combination thereof.

The decrease in current density may be about 0.5 mA/cm². The greater decrease in current density may be about 4 mA/cm². The reduction in the flow rate may be about 1.5%.

In another aspect, there is provided a method for continuously treating a wastewater that includes ammonia. The method includes: accepting the wastewater into an electrochemical cell at a variable flow rate; generating chlorine from chloride present in the wastewater using an anode of the electrochemical cell; generating a treated effluent by allowing the generated chlorine to form hypochlorous acid, and permitting the hypochlorous acid to oxidize the ammonia; measuring the concentration of ammonia in the effluent; measuring the concentration of chlorine in the effluent; controlling, based on at least one of the measured ammonia and chlorine concentrations: (a) the current density of the anode of the electrochemical cell; (b) the flow rate of the wastewater accepted by the electrochemical cell; or (c) both.

The method may further include: measuring the concentration of ammonia in the wastewater being accepted into the electrochemical cell; and controlling the current density of the anode of the electrochemical cell based on the concentration of ammonia measured in the wastewater being accepted into the electrochemical cell.

The method may also include adding chloride ions to the wastewater before the wastewater is accepted into the electrochemical cell.

Controlling the current density, the flow rate of the wastewater, or both may include: (a) increasing the current density applied to the anode by an amount when the ammonia concentration in the effluent exceeds 0.5 ppm and the current density is less than 12 mA/cm$^2$; (b) reducing the flow rate of the wastewater accepted into the electrochemical cell when the ammonia concentration in the effluent exceeds 0.5 ppm and the current density is 12 mA/cm$^2$ or greater; (c) decreasing the current density applied to the anode by an amount when the ammonia concentration in the effluent is less than 0.5 ppm and the concentration of chlorine is from 0.8-2 ppm; (d) increasing the flow rate of the wastewater accepted into the electrochemical cell when the flow rate is less than an initial flow rate and when the ammonia concentration in the effluent is less than 0.5 ppm and the concentration of chlorine is from 0.8-2 ppm; or (e) decreasing the current density applied to the anode by an amount greater than the decrease in current density when the ammonia concentration in the effluent is less than 0.5 ppm and the concentration of chlorine is from 0.8-2 ppm, the greater decrease being when the ammonia concentration in the effluent is less than 0.5 ppm and the concentration of chlorine is from 2-10 ppm.

Increasing or decreasing the current density may correspond to increasing or decreasing the current density by about 0.5 mA/cm$^2$.

Decreasing the current density applied to the anode by an amount greater than the decrease in current density when the ammonia concentration in the effluent is less than 0.5 ppm and the concentration of chlorine is from 0.8-2 ppm may correspond to decreasing the current density by about 4 mA/cm$^2$.

Reducing or increasing the flow rate of the wastewater accepted into the electrochemical cell may correspond to reducing or increasing the flow rate by about 1.5%.

The method may include repeated measuring and controlling steps.

The method may include allowing a period of time to pass between: (a) changing the current density of the anode of the electrochemical cell and/or the flow rate of the wastewater accepted by the electrochemical cell, and (b) a subsequent measuring of the concentration of ammonia and/or chlorine in the effluent.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Figure 1:
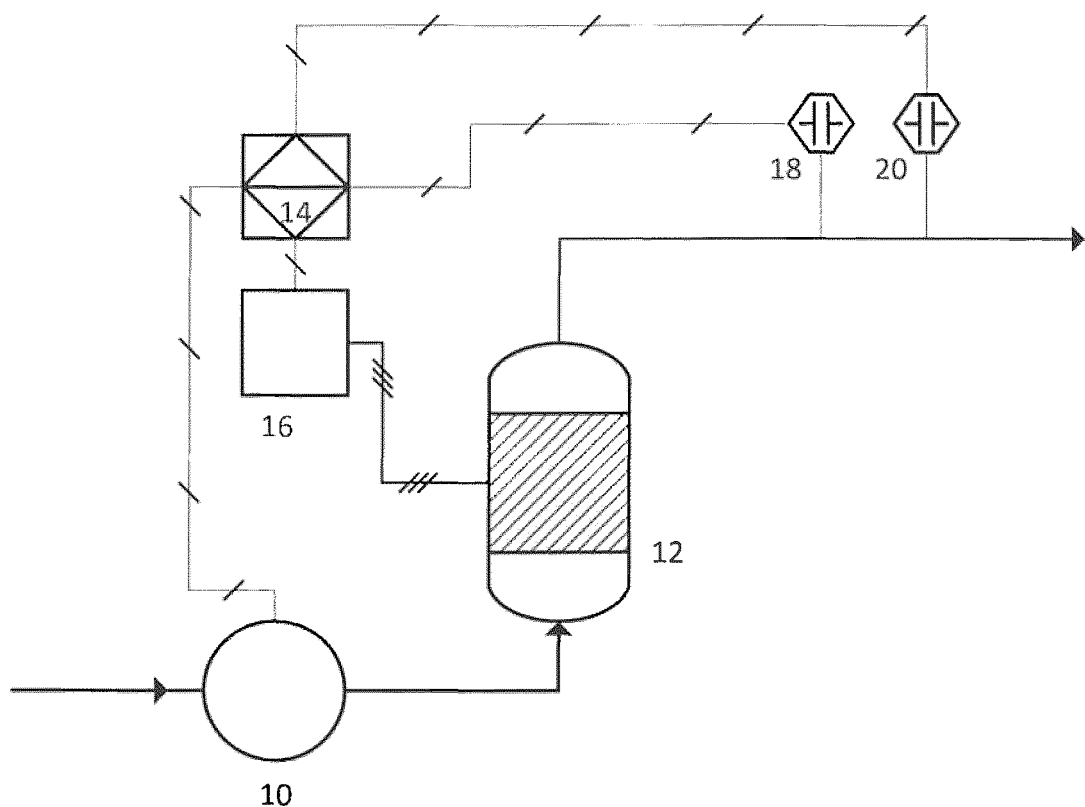
FIG. 1 is an illustration of a system according to the present disclosure.

Oxidation of ammonia in water, such as waste water, may be achieved through breakpoint chlorination. Breakpoint chlorination may be used to treat water having concentrations of 10-30 ppm of ammonia. Breakpoint chlorination uses hypochlorite and hypochlorous acid to oxidize the ammonia to $N_2$ gas or nitrate.

In breakpoint chlorination, as the dose of chlorine is increased the total chlorine residual increases up to a certain concentration (the hump) after which residual chlorine decreases to a very low value (breakpoint) and subsequently increase linearly with dose. The total nitrogen concentration is constant up to the hump (due to the formation of chloramines) and decreases to zero or nearly zero at the breakpoint.

In batch processes, it is possible to determine how much chlorine should be added to the water in order to oxidize a known amount of ammonia without resulting in undesirable levels of chlorine, hypochlorous acid, hypochlorite, or combinations thereof in the water. However, in continuous processes operated at steady state, a minimum dosing and retention time of chlorine is required in order to sufficiently oxidize the ammonia. Increasing this dosing and retention time may be undesirable as doing so increases the free chlorine concentration in the effluent.

Chlorine, and then hypochlorite and/or hypochlorous acid, can be generated anodically in an electro-cell using water and a source of chloride ions. The source of chloride may be, for example, sodium chloride or potassium chloride. However, it is not necessary to add chloride to water that already contains chloride. For example, wastewater often contains chloride before it arrives at the system for treatment. Examples of methods of anodically generating chlorine are discussed in M. Spasojevic, N. Krstajic, P. Spasojevic, L. Ribic-Zelenovic, Modelling current efficiency in an electrochemical hypochlorite reactor, Chemical Engineering Research and Design (2014).

The electrochemical cell may be run under current control, voltage control, or both. The cell may be subjected to a current having a frequency between about 10 Hz and about 1 GHz. In some examples, the current may have a frequency between about 10 Hz and about 10 MHz, for example between about 10 Hz and about 1 MHz, or between about 10 Hz and about 250 kHz. The current density may have a value between about 1 mA/cm$^2$ and about 100 mA/cm$^2$, for example between about 1 mA/cm$^2$ and about 20 mA/cm$^2$. The cell may be subjected to an electrical signal at an electrical charge of up to about 100,000 coulombs/liter, for example between about 100 and about 10,000 coulombs/liter. In a particular example, the cell may be subjected to an electrical signal at an electrical charge of about 900 and about 3500 coulombs/liter.

Since the chlorine is being generated in situ and at the surface of a plate, the ammonia oxidation characteristics may be different in the method and system of the present disclosure than in traditional breakpoint chlorination. During the oxidation of ammonia by in-situ electrogenerated chlorine it is possible to reach high ratios $Cl_2$:N in the vicinity of the anode. Consequently chloramines may be decomposed to nitrogen in a reaction zone close to the anode and the contamination of the bulk by chloramines may be diminished. Also, due to local high pH in the vicinity of the anode, chlorine gas may react directly with ammonium ion ($NH_4^+$) with formation of trichloramine ($NCl_3$) which may be decomposed to nitrogen gas.

Generally, the present disclosure provides a method and system for oxidation of ammonia in water, for example waste water, using chlorine generated via electrolysis. The generated chlorine is dissolved in the water and generates hypochlorous acid. The hypochlorous acid oxidized the ammonia. The treated water is expelled as an effluent. The method and system are continuous methods and systems. The ammonia concentration in the water flowing through the method and system may change, for example on an hourly, daily or weekly basis.

The method and system also includes at least one sensor to measure the concentration of ammonia in the effluent and/or the concentration of chlorine gas in the effluent. The method and system also includes at least one controller in communication with the at least one sensor, and/or the anode to reduce the current density of the anode generating the chlorine, and/or a flow controller to change the flow rate of the ammonia containing water entering the reactor.

In the context of the present disclosure, the methods and systems include "at least one controller" in communication with: one or more sensors (such as an ammonia sensor and a chlorine sensor); one or more system elements (such as an anode of the electrochemical cell and a flow rate controller); or both. Contemplated systems are not limited to a single controller performing a single task (for example: sensing or controlling a system element), nor are they limited to a single controller performing all of the tasks. Contemplated system may include, for example: a single controller in communication with a plurality of sensors and a plurality of system elements; a first controller in communication with a plurality of sensors and a second controller in communication with a plurality of system elements; a plurality of controllers each in communication with one sensor of a plurality of sensors, and a single controller in communication with a plurality of system elements; a single controllers in communication with a plurality of sensors, and a plurality of controllers each in communication with one element of a plurality of system elements; a plurality of controllers each in communication with one sensor of a plurality of sensors, and a plurality of controllers each in communication with one element of a plurality of system elements; or a plurality of controllers each in communication with at least one sensor and/or system element. In systems that include a plurality of controllers, some or all of the controllers may be in communication with each other (directly or indirectly).

The method and system may also include at least one sensor to measure the concentration of ammonia in the water. Such a sensor may be used to established desirable parameters for electrogenerated chlorine in order to comply with the known ratio $Cl_2$:N from breakpoint chlorination (pre-operational setup).

The electrochemical cell may be such as the kind disclosed in U.S. Pat. Nos. 6,419,815 and 6,126,794 of Chambers, both issued to Xogen Technologies Inc. and incorporated herein by reference (hereinafter "the Xogen patents"). The electrochemical cell includes an anode and a cathode. As described in the Xogen patents at columns 3-5, the electrode "cells" may each include two or more spaced-apart electrodes that are adapted to be immersed in the wastewater. It is preferable to maintain an equal spacing between the electrodes, and it is preferable to minimize the spacing between the electrodes. However, the spacing between the electrodes cannot be positioned excessively close because arcing between the electrodes would occur. It has been determined that a spacing of 1 mm or less is optimal spacing for producing oxyhydrogen-rich gas, but an increased spacing of up to approximately 5 mm may work effectively while being less subject to fouling due to accumulation of solids between the electrodes. A spacing above 5 mm may also be feasible, but tends to reduce the output of chlorine gas and increases power requirements.

It is preferable to include many pairs of electrodes (e.g. dozens or hundreds) within each cell. The electrodes can be almost any shape, but preferably comprise flat or mesh plates closely spaced and parallel to each other. Alternative embodiments may include coaxially aligned cylinders. Insulating spacers can be interposed between adjacent electrodes to maintain equal spacing between the electrodes and to prevent current leakage therebetween.

The anode material will electrochemically corrode due to oxidation, while the cathode will be subjected to passivation. Consumable metal plates, for example iron or aluminum, may be used as sacrificial electrodes. One electrode material may include stainless steel for its low cost and durability, but it may be possible to include other conductive metals. The electrodes may be coated or uncoated. Coated electrodes may be, for example, coated metal, coated plastic, coated glass, or another coated substrate. The electrodes may be coated with a single layer or multiple layers. The coating may include one or more layers of a mixed metal oxide, a conducting metal, a metal alloy, or combinations thereof. For example, the coating may be one or more layers of: Ruthenium Oxide, Iridium Oxide, Platinum, Titanium dioxide, Tin Oxide, or any combination thereof. The mixed metal oxide, metal or metal alloy may be doped with other metals. One example of a layer that includes a metal doped mixed metal oxide is a layer of antimony doped tin oxide. Specific examples of coated electrodes are available from Denora S.p.A, for example DSA™ electrodes which are titanium electrodes coated with a mixed metal oxide of precious metals such as iridium, ruthenium, platinum, rhodium and tantalum. Other examples of coated electrodes include coatings applied to titanium coated plastic.

As further described in the Xogen patents, a high-frequency pulsed direct current (DC) electrical signal may be applied to the electrodes. The pulsed signal can be almost any waveform and have a variable current level, voltage level, frequency and mark-space ratio (i.e., a ratio of the duration of a single pulse to the interval between two successive pulses). The source of power for the power supply may include a mains 110 volts or batteries, such as 12-volt car batteries. For example, the power supply may comprise two 12-volt batteries arranged in series to provide a 24-volt supply. For powering a large-scale wastewater treatment system in, for example, a municipal wastewater treatment plant, a more complex power supply may be required for generating 24-volt pulsed DC signal having sufficient power to drive the large cells required. Alternatively, multiple smaller electrode cells may be provided for redundancy and spaced apart in a reaction vessel or other reaction zone, in which case the cells may be driven by simpler independent power supplies.

A controller may be used in conjunction with the batteries or other power source to generate one of a variety of pulsed output waveforms, such as a square wave, a saw tooth wave, or a triangular wave, which can be applied to the electrodes.

When the ammonia concentration in the effluent exceeds 0.5 ppm, and the current density is less than 12 $mA/cm^2$, the at least one controller increases the current density applied to the anode of the reactor, for example by 0.5 $mA/cm^2$.

When the ammonia concentration in the effluent exceeds 0.5 ppm and the current density is 12 $mA/cm^2$ or greater, the flow rate of the ammonia-containing water into the reactor is reduced, for example by 1.5% of the volume of the reactor per minute. This reduction in flow rate allows more chlorine to be produced per unit volume.

When the ammonia concentration in the effluent is less than 0.5 ppm and the concentration of chlorine is from 0.8-2 ppm, the at least one controller decreases the current density applied to the anode of the reactor, for example by 0.5 mA/cm$^2$, or increases the flow rate of the ammonia-containing water into the reactor if the flow rate is less than the flow rate at the start of the method.

When the ammonia concentration in the effluent is less than 0.5 ppm and the concentration of chlorine is from 2-10 ppm, the at least one controller decreases the current density applied to the anode of the reactor by an amount greater than the decrease in current density when the concentration of chlorine is from 0.8-2 ppm, for example by 4 mA/cm$^2$.

The current density may be decreased by the at least one controller, but not below the minimum level required to treat the water at the flow rate of the system. In the context of the present disclosure, the minimum level refers to the current density that provides the anode with the electrical potential necessary for the electron transfer in the reaction of chloride anion (Cl) in order to produce chlorine ($Cl_2$). While the thermodynamic data are known, the kinetics data may be determined experimentally.

Once a change to the current density and/or flow rate has been made, a period of time is allowed to pass before the concentration of ammonia in the effluent is again measured. The period of time may be, for example, three times the retention time of the reactor.

The at least one sensor to measure the concentration of ammonia in the effluent may comprise an ion selective electrode; or a vaporizer to volatilize the ammonia from the effluent and an ammonia gas sensing electrode to determine the amount of volatilized ammonia. Alternatively, ammonia can be also analysed as Total Nitrogen using a TOC-TN analyzer (based on monitoring of $NO_2$ luminescence following oxidation of nitrogenous compounds), or spectrophotometrically by indophenol blue method measuring the absorbance at 640 nm.

The method and system may also include one or more sensors to measure: the pH, the oxidation-reduction potential (ORP), the concentration of chloride (ion), or the amount of dissolved oxygen.

In one example, as illustrated in FIG. 1, the system includes a pump (10), an electrocell reactor (12), a programmable logic controller (14), and a controller (16), a sensor to measure the concentration of ammonia in the effluent (18), and a sensor to measure the concentration of total chlorine in the effluent (20).

The pump (10) flows waste water to the electrocell reactor (12), which electrolytically generates chlorine gas from chloride ions in the waste water on application of an electrical current to the anode. As discussed above, the generated chlorine gas oxidizes ammonia present in the waste water to produce treated water. The PLC (14) instructs controller (16) to increase, decrease, or maintain the current density applied to the anode of the electrocell reactor (12) based on the concentrations of the ammonia and/or total chlorine measured by sensors (18 and 20). The PLC (14) also instructs pump (10) to increase, decrease, or maintain the flow rate of the waste water into the electrocell reactor (12) measured by sensors (18 and 20).

Figure 2:
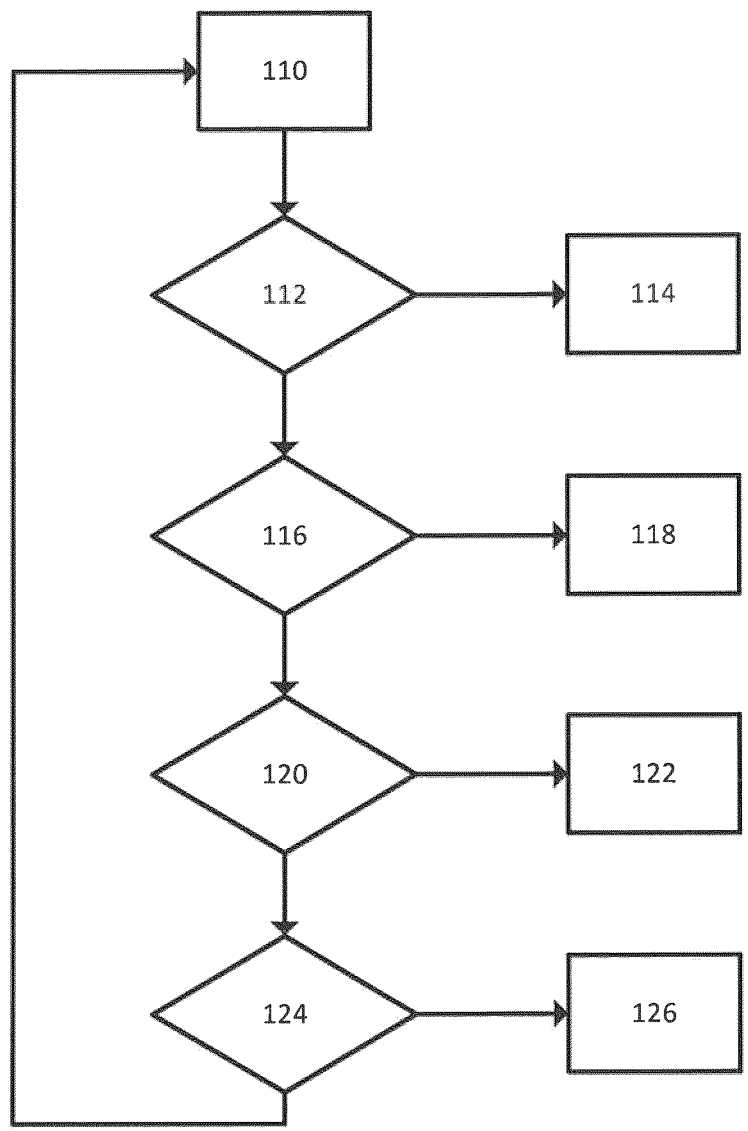
FIG. 2 is a flowchart illustrating a method according to the present disclosure.

The PLC (14) instructs the controller (16) and pump (10) based on instructions illustrated in the flowchart shown in FIG. 2.

In step 110, the sensors (18 and 20) measure the concentration of ammonia and total chlorine in the treated water. As illustrated at step 112, when the ammonia concentration in the effluent exceeds 0.5 ppm and the current density is less than 12 mA/cm$^2$, the PLC instructs the controller to increases the current density applied to the anode of the electrocell reactor (114).

As illustrated at step 116, when the ammonia concentration in the effluent exceeds 0.5 ppm and the current density is 12 mA/cm$^2$ or greater, the PLC instructs the pump to reduce the flow rate of the ammonia-containing water entering the reactor (118).

As illustrated at step 120, when the ammonia concentration in the effluent is less than 0.5 ppm and the concentration of chlorine is from 0.8-2 ppm, the PLC instructs the controller to decrease the current density applied to the anode of the electrocell reactor (122).

As illustrated at step 124, when the ammonia concentration in the effluent is less than 0.5 ppm and the concentration of chlorine is from 2-10 ppm, the controller decreases the current density applied to the anode of the electrocell reactor by an amount greater than the decrease in current density when the concentration of chlorine is from 0.8-2 ppm (126).

After a change to the current density and/or flow rate has been made, a period of time is allowed to pass and the steps are repeated.

In the preceding description, for purposes of explanation, numerous details are set forth in order to provide a thorough understanding of the embodiments. However, it will be apparent to one skilled in the art that these specific details are not required. In other instances, well-known electrical structures and circuits may be shown in block diagram form in order not to obscure the understanding.

For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A method for continuously treating a wastewater that includes ammonia, the method comprising:
   accepting the wastewater into an electrochemical cell at a variable flow rate;
   generating chlorine from chloride present in the wastewater using an anode of the electrochemical cell;
   generating a treated effluent by allowing the generated chlorine to form hypochlorous acid, and permitting the hypochlorous acid to oxidize the ammonia;
   measuring the concentration of ammonia in the effluent;
   measuring the concentration of chlorine in the effluent;
   controlling, based on at least one of the measured ammonia and chlorine concentrations:
      the current density of the anode of the electrochemical cell; or
      the flow rate of the wastewater accepted by the electrochemical cell; or
      both the current density of the anode of the electrochemical cell and the flow rate of the wastewater accepted by the electrochemical cell;
   wherein controlling the current density of the anode of the electrochemical cell, comprises:
      a1) increasing the current density applied to the anode by an amount when the ammonia concentration in the effluent exceeds 0.5 ppm and the current density is less than 12 mA/cm$^2$;
      a2) decreasing the current density applied to the anode by an amount when the ammonia concentration in the effluent is less than 0.5 ppm and the concentration of chlorine is from 0.8-2 ppm; or
      a3) decreasing the current density applied to the anode by an amount greater than the decrease in current density when the ammonia concentration in the effluent is less than 0.5 ppm and the concentration of chlorine is from 0.8-2 ppm, the greater decrease being when the ammonia concentration in the effluent is less than 0.5 ppm and the concentration of chlorine is from 2-10 ppm;
   and wherein controlling the flow rate of the wastewater comprises:
      b1) reducing the flow rate of the wastewater accepted into the electrochemical cell when the ammonia concentration in the effluent exceeds 0.5 ppm and the current density is 12 mA/cm$^2$ or greater; or
      b2) increasing the flow rate of the wastewater accepted into the electrochemical cell when the flow rate is less than an initial flow rate and when the ammonia concentration in the effluent is less than 0.5 ppm and the concentration of chlorine is from 0.8-2 ppm.

2. The method according to claim 1, further comprising:
   measuring the concentration of ammonia in the wastewater being accepted into the electrochemical cell; and
   controlling the current density of the anode of the electrochemical cell based on the concentration of ammonia measured in the wastewater being accepted into the electrochemical cell.

3. The method according to claim 1, further comprising adding chloride ions to the wastewater before the wastewater is accepted into the electrochemical cell.

4. The method according to claim 1, wherein increasing or decreasing the current density comprises increasing or decreasing the current density by about 0.5 mA/cm$^2$.

5. The method according to claim 4, wherein decreasing the current density applied to the anode by an amount greater than the decrease in current density when the ammonia concentration in the effluent is less than 0.5 ppm and the concentration of chlorine is from 0.8-2 ppm comprises decreasing the current density by about 4 mA/cm$^2$.

6. The method according to claim 1, wherein reducing or increasing the flow rate of the wastewater accepted into the electrochemical cell comprises reducing or increasing the flow rate by about 1.5%.

7. The method according to claim 1, wherein the method comprises repeating the measuring and controlling steps.

8. The method according to claim 7, wherein the method comprises allowing a period of time to pass between:
   (a) changing the current density of the anode of the electrochemical cell and/or the flow rate of the wastewater accepted by the electrochemical cell, and
   (b) a subsequent measuring of the concentration of ammonia and/or chlorine in the effluent.

* * * * *